US008117293B1

(12) United States Patent
Anderson

(10) Patent No.: US 8,117,293 B1
(45) Date of Patent: Feb. 14, 2012

(54) METHOD OF RECEIVING, STORING, AND PROVIDING DEVICE MANAGEMENT PARAMETERS AND FIRMWARE UPDATES TO APPLICATION PROGRAMS WITHIN A MOBILE DEVICE

(75) Inventor: Ian P. Anderson, Guildford (GB)

(73) Assignee: Smith Micro Software, Inc., Aliso Viejo, CA (US)

( * ) Notice: Subject to any disclaimer, the term of this patent is extended or adjusted under 35 U.S.C. 154(b) by 1591 days.

(21) Appl. No.: 11/030,373

(22) Filed: Jan. 5, 2005

(51) Int. Cl.
*G06F 15/16* (2006.01)
(52) U.S. Cl. ........................ 709/223; 709/203
(58) Field of Classification Search .................. 709/217, 709/219, 223, 200–203, 218, 227
See application file for complete search history.

(56) References Cited

U.S. PATENT DOCUMENTS

| | | | |
|---|---|---|---|
| 2005/0039178 A1* | 2/2005 | Marolia et al. ............... | 717/168 |
| 2005/0182697 A1* | 8/2005 | Rao .............................. | 705/28 |
| 2005/0228847 A1* | 10/2005 | Hayes .......................... | 709/200 |
| 2006/0039561 A1* | 2/2006 | Ypya et al. ................... | 380/270 |
| 2006/0090202 A1* | 4/2006 | Liu et al. ..................... | 726/17 |
| 2008/0235386 A1* | 9/2008 | Oommen ..................... | 709/230 |
| 2009/0030965 A1* | 1/2009 | Hayes, Jr. .................... | 709/200 |

* cited by examiner

*Primary Examiner* — Moustafa M Meky
(74) *Attorney, Agent, or Firm* — Smyrski Law Group, A P.C.

(57) ABSTRACT

A method for the efficient persistent storage of Device Management (DM) information on a mobile device is provided. More specifically, the present design provides methods for applications to access and update this information consistent with the Open Mobile Alliance (OMA) DM standard by extending the OMA SyncML DM standard and providing a physical implementation of a tree management data structure. This implementation enables device management parameters, originating from server applications to be received, stored and accessed by a client mobile device. The present design incorporates centralized access and security rights management for securing DM information such that only permitted applications may access and update this information. In addition, the present design provides a method for retrieving firmware update packages, saving the package as specified by the OMA Firmware Update Management Object standard, and triggering the update process to apply the package by an update agent.

24 Claims, 6 Drawing Sheets

METHOD OF RECEIVING, STORING, AND PROVIDING DEVICE MANAGEMENT PARAMETERS AND FIRMWARE UPDATES TO APPLICATION PROGRAMS WITHIN A MOBILE DEVICE

BACKGROUND OF THE INVENTION

1. Field of the Invention

The present invention relates generally to the field of computer systems, and more specifically for establishing a device management tree structure to store and retrieve management related data in a mobile communication device. In particular, the present invention relates to a method for receiving management information from a server and storing this information on a mobile device, employing the Synchronization Markup Language (SyncML) device management (DM) Open Mobile Alliance standards, and the subsequent access and update of this information by various software applications. Moreover, the present invention relates to integrating a firmware update mechanism and a persistent storage mechanism with the aforementioned method.

2. Description of the Related Art

The Open Mobile Alliance (OMA), basically a standards body, was formed in June 2002 to drive interoperability of mobile data services. OMA is responsible for defining industry wide requirements, architectural frameworks, and industry specifications for enabling technologies and end-to-end interoperability to ensure seamless mobile services for end users worldwide.

The OMA consolidated a number of ongoing initiatives under one standards body. These initiatives include:
  Synchronous Markup Language
  Location Interoperability Forum
  Multimedia Messaging Service Interoperability Group, and
  Wireless Village Initiative.

SyncML is an open standard providing a common language for communications between devices, applications and networks enabling data mobility. The SyncML initiative includes two fundamental open standards relevant to the present design. First, the SyncML Data Synchronization (SyncML DS) specification to ensure a consistent set of data that is always available on any device or application.

Secondly, the SyncML Device Management (SyncML DM) specification to enable over-the-air administration of devices and applications, addressing configuration, update and support of mobile devices.

SyncML is the common language for synchronizing all devices and applications over any network. SyncML leverages the Extensible Markup Language (XML). With SyncML, networked information can be synchronized with any mobile device, and mobile information can be synchronized with any networked applications. Solutions supporting SyncML enable user profile information associated with software applications such as email, calendars, contact list and other configuration data to be manage and maintained in a consistent, accessible and up to date manner regardless where the information is stored.

The SyncML device management initiative provides a universal protocol for remote management of mobile devices.

The DM specifications define a protocol for use between a management server and a mobile device, the data made available for remote manipulation (e.g. micro-browser and email settings, and security policy that determines which applications can access and update a particular DM parameter).

Within the OMA is a working group responsible for specifying protocols and mechanisms that achieve management of devices. Device Management (DM) includes setting initial device configuration information (e.g. updating or reading operating parameters), installation and updates of persistent information, retrieval of management information, and software maintenance. DM information includes: configuration settings, operating parameters, software installation, software and firmware updates, application settings and user preferences.

OMA DM is the protocol defined by the OMA for managing mobile devices, formerly know as SyncML DM, addresses the remote management of mobile devices (i.e. device management) and has defined a protocol standard for transferring DM information between a server computer and a mobile device. This standard builds upon and extends the SyncML standard for Data Synchronization (i.e. the protocol defined by the OMA to allow mobile devices to synchronize their data with a remote server) originally published by the SyncML consortium. Albeit flexile, the current OMA DM standards do not provide sufficient physical details relating how to retrieve, store, access and update this information on the mobile device. The OMA DM standard provides the logical organization of the DM tree, but does not specify how the tree should actually be implemented. Additionally, the OMA has not provided interface specifics for Original Equipment Manufacture or third party DM applications to access and utilize DM information resident on the mobile device. Moreover, the draft OMA Firmware Update Management Object specification includes support of firmware download, however they do not provide an update agent for applying software or firmware updates on a mobile device.

A design that provides a technique to implement a management tree data structure to physically store device management information, tightly integrated with digital rights management (e.g. security and access rights), and provide a programming interface for software applications to retrieve this DM information may provide a reduction in the size of code and improve the time to market for mobile device manufactures when deploying DM compliant solutions and other advantageous qualities over previously known designs, including designs employing the SyncML DM architecture. A design further comprising persistent storage of this information and a method of updating firmware images on a mobile device may also provide similar improvements.

SUMMARY OF THE INVENTION

The present design provides an open management client software architecture that implements a tree management data structure for persistent storage of name/value pairs used to retrieve, store and access device management information within a mobile device. A persistence application-programming interface (API) is included to enable persistent storage of the tree contents and the ability to write the contents of the data structure to a Flash File System (FFS). The present design is capable of communicating with remote device management servers and employs SyncML functionality to synchronize the tree node contents with a copy of stored on these servers.

One embodiment of the present design is to receive and store over-the-air (OTA) provisioning parameters, such as a Wireless Access Protocol (WAP) and email gateway address to a mobile device, communicated from a DM compliant server.

The present design allows other software applications to read and write the tree information via an API that enables access to the tree information. In addition, the present design is capable of controlling this access by applications by checking permission rights associated with each node in the tree. This is achieved by use of an access control list mechanism as defined in the OMA DM specification. The tree management data structure used to store the name/value pairs also provides for the storage of certain metadata relating to a node, or a node and the underlying sub-tree. Examples of such metadata would be the access control lists, information on whether nodes are permanent or dynamic, and information about the data type of the value. Moreover, the present design is capable of storing the value associated with particular nodes external to the tree management data structure, while still providing storage for the metadata within the tree management data structure. This functionality is realized by an external storage API.

A further embodiment of the present design provides software application developers a method to access and store node values in the DM tree used by their applications. This is especially well suited for parameters that are read once at application start-up or can be polled periodically, and do not need to be immediately updated in the application if a DM server subsequently modifies them. More specifically, an original equipment manufacture or $3^{rd}$ party software application such as a Wireless Access Protocol micro-browser, Email messaging client, and a Multimedia Messaging Service application to read previously stored user preferences, application settings and configuration parameters on start-up.

The present design re-uses and extends the SyncML toolkit provided by the OMA and modularizes a firmware update component to allow one or more update packages to be stored, read for use by an integrated update agent.

A typical embodiment of the present design would be to pre-load a rollback package in concert with downloading a new firmware update package and storing both within the mobile device, available for installation.

In summary, the present design implements the following components:

1. OMA DM compatible client, capable of handling parameter-provisioning functions
2. A physical and practical implementation of the management tree concept espoused in the OMA DM standard
3. Extensions to allow the handling of the OMA Firmware Update Management Object
4. Integration of an Update Agent, and
5. A command line differencing tool.

The present design re-uses and extends the SyncML toolkit provided by the OMA, provides a plug-in architecture for OEM code modules to take advantage of the DM functions, portability (i.e. code) and modularizes the firmware update component allowing it to be easily integrated into other supplier's OMA DM client code.

DESCRIPTION OF THE DRAWINGS

The present design is illustrated by way of example, and not by way of limitation, in the figures of the accompanying drawings.

DETAILED DESCRIPTION OF THE INVENTION

Reference will now be made in detail to the preferred designs of the invention, examples of which are illustrated in the accompanying drawings and tables. While the invention will be described in conjunction with the preferred designs, it will be understood that they are not intended to limit the invention to those designs. On the contrary, the invention is intended to cover alternatives, modifications, and equivalents, which may be included within the spirit and scope of the invention as defined by the appended claims.

The present design will now be described in relation to an exemplary open management client software executing on a mobile device. The open management client is an Open Mobile Alliance (OMA) Device Management (DM) compatible client responsible for handling the DM session. The mobile device may be a Smart phone where the present design is a software component implemented as an application, or a Feature phone where the present design is integrated with the operating system. The present design provides client software on a mobile device compatible with the DM standard as defined by the OMA. This client allows a mobile device to interoperate with any OMA DM compliant server, produced by a number of manufactures, and to exchange management information with these servers. A typical application of this standard allows the OMA DM protocol to act as a replacement for proprietary parameter provisioning mechanisms.

One embodiment of the present design is to receive and store over-the-air (OTA) provisioning parameters, such as a Wireless Access Protocol (WAP) and email gateway address to a mobile device, communicated from a DM compliant server.

The present design provides:

1. Rights management support using Access Control Lists (ACL)
2. Sending and receiving alerts, and associated applications programming interface (API) for porting to a particular manufactures man machine interface (MMI) (i.e. user interface)
3. Persistence API for the device management tree, including the ability to write to Flash memory or a Flash File System (FFS)
4. Tree Access API to allow other components to read and write the tree
5. External Storage API to allow the data values of particular nodes to be stored external to the tree, and
6. Firmware update functionality integrated with an update agent.

The present design extends the functionality of the SyncML reference toolkit published by the SyncML consortium, which was designed to support data synchronization and not device management. This extension includes the ability for multiple applications to communicate with a DM server.

Figure 1:
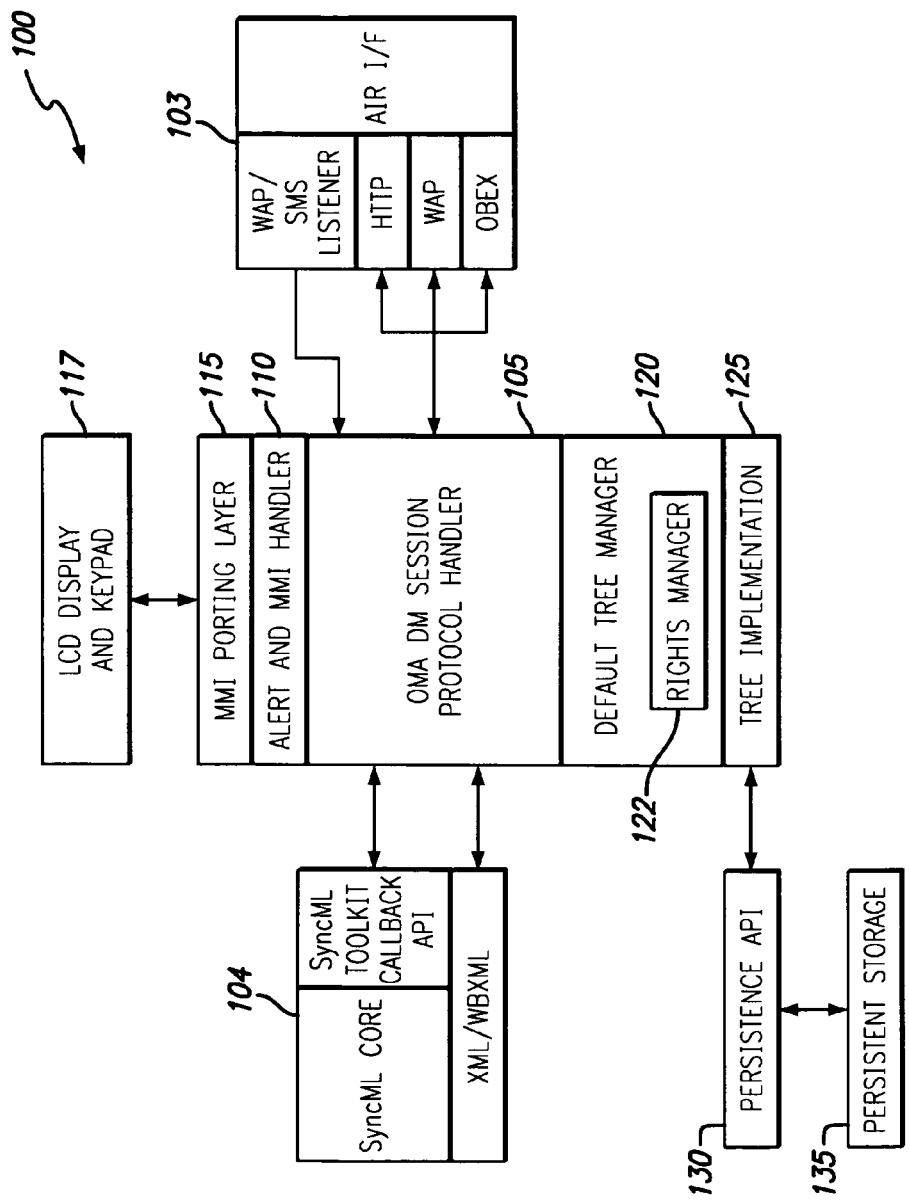
FIG. 1 illustrates an open management client software architecture components, leveraging the SyncML reference toolkit, allowing a mobile device to interoperate with an OMA DM server via an over-the-air interface.

The present design will now be described in relation to general open management client software architecture as illustrated in FIG. 1, showing the various components implemented to support over-the-air applications (i.e. remote applications) to retrieve, store, and provide DM information physically stored within the mobile device. The present design communicates with OMA DM servers through a communications channel. OTA applications may employ a variety of access protocols to support this communication, at 103, providing the exchange of information with a remote server. OTA refers to using a wireless mechanism to provide provisioning data. These protocols include Wireless Application Protocol/Short Message Service (WAP/SMS), Hypertext Transfer Protocol (HTTP), Wireless Application Protocol (WAP), and Object Exchange (OBEX) protocols. The OMA DM session protocol handler 105 provides access to the other internal components of the present design independent of the communications access protocol. This session protocol handler interprets the sequence of packages as defined in the OMA DM specifications, maintains state of the session, and performs the protocol at the session level (including mutual authentication of client and server). The detailed functionalities and responsibilities of the session protocol handler will be obvious to one skilled in the art.

The DM protocol allows for synchronous alert messages to be sent by a server to the client. These alert messages are received by the Session Protocol Handler 105 and are forwarded to the Alert and Man Machine Interface (MMI) handler 110. The Alert and MMI handler provides support for these incoming alert messages, sent from a DM compliant server, and forwards them to a MMI porting layer API 115 component. The MMI porting layer API, implemented according to the specific mobile device display and keyboard hardware 117, provides presentation (i.e. visual display) of the alert and routes the users response (i.e. keypad buttonpress) back to the Alert and MMI handler 110 which effects the appropriate response to be returned to the server via the session protocol handler 105 component.

The present design implements a management tree in accordance with the abstraction defined in the OMA DM standard. The purpose of the tree is to persistently store named key/value pairs. The tree consists of named nodes, each of which contains one or more sub-nodes, or one or more leaves (i.e. name/value pairs). This implementation restricts the tree such that each node may only contain sub-nodes, or leaves, but not a mixture of both. Understanding of tree data structure design should be obvious to one skilled in the art.

The Default Tree Manager 120 provides access to the tree from the server side. When an OTA server based application needs to retrieve or store DM information, the Tree Manager 120 component of the present design implements the callback functions required by the SyncML Reference Toolkit (RTK) at 104 to support all received SyncML commands (e.g. add nodes, delete nodes, get values, replace values, Exec, etc.). The SyncML RTK implements the core SyncML protocol.

The present design provides the necessary logic to support checking against the Access Control List (ACL) and AccessType values, via the Rights Manager 122, for each node ensuring that the requested operation is permissible in accordance with the stored permissions. The ACL and AccessType values are metadata associated with the node. The present design implements an ACL mechanism at each level of the management tree. This control limits the servers that may access the node and the functions they may execute. As found in typical control mechanisms, this design allows nodes to inherit access control settings from the parent node when they have no specific settings of their own. The OMA DM standard specifies that the ACL comprises of a list of server names, with associated rights to read, write, add, and delete data. Such server names would normally be fully qualified host names (e.g. managementserver.mycompany.com) The OMA DM standard only defines rights management on the nodes in the management tree from the perspective of a server trying to access them. It is silent on the issue of controlling access by different applications running on the mobile device. The present design extends the access control concept, by requiring an application to specify a pseudo hostname (e.g. emailclient.localhost) when accessing information in the device management tree, or when registering callback functions. By default all applications have unrestricted access, but by specifying localhost, or applicationname.localhost as part of the ACL, only the rights specifically granted are allowed.

The OMA DM standard requires certain management objects to exist. This implementation supports standardized management objects (e.g. Devinfo, DevDetails, SyncML, etc.) required by the OMA DM standard. The understanding of these management objects should be obvious to one skilled in the art. The Tree Implementation 125 essentially contains name:value pairs, where the names are structured like a Universal Resource Locator (URL). The present design implements how and where the nodes of the DM tree exist and where the associated data values and metadata are stored. The metadata associated with each node includes the type of information stored (e.g. character string, integer, binary data, etc.) and access rights information. The present design defines a Tree Implementation 125 component that provides a data structure to store the node names, the metadata for the nodes, and the data for the nodes. The specific collection of implemented named values (i.e. leaf nodes) is not essential to the understanding of the present design by one skilled in the art. The present design normally stores the tree in Random Access Memory (RAM).

The present design also provides a persistent storage mechanism for storing and retrieving Device Management information available for use by resident OTA server-hosted and resident software applications. While the description provided herein is applicable to physical storage of the DM information on a mobile device, it is to be understood that the design is not so limited, and may be employed in other devices.

This design provides functions for writing the data structure to Flash memory or a Flash File System (FFS). The data structure may be written to persistent storage 135 via the Persistence API 130. Additionally, the Persistence API 130 provides the ability to load the data structure into RAM when the operating system is started.

Another embodiment of the present design provides application developers a method to access and store node values in the DM tree used by their applications. This is especially well suited for parameters that are read once at application start-up or can be polled periodically, and do not need to be immediately updated in the application if a DM server subsequently modifies them.

Figure 2:
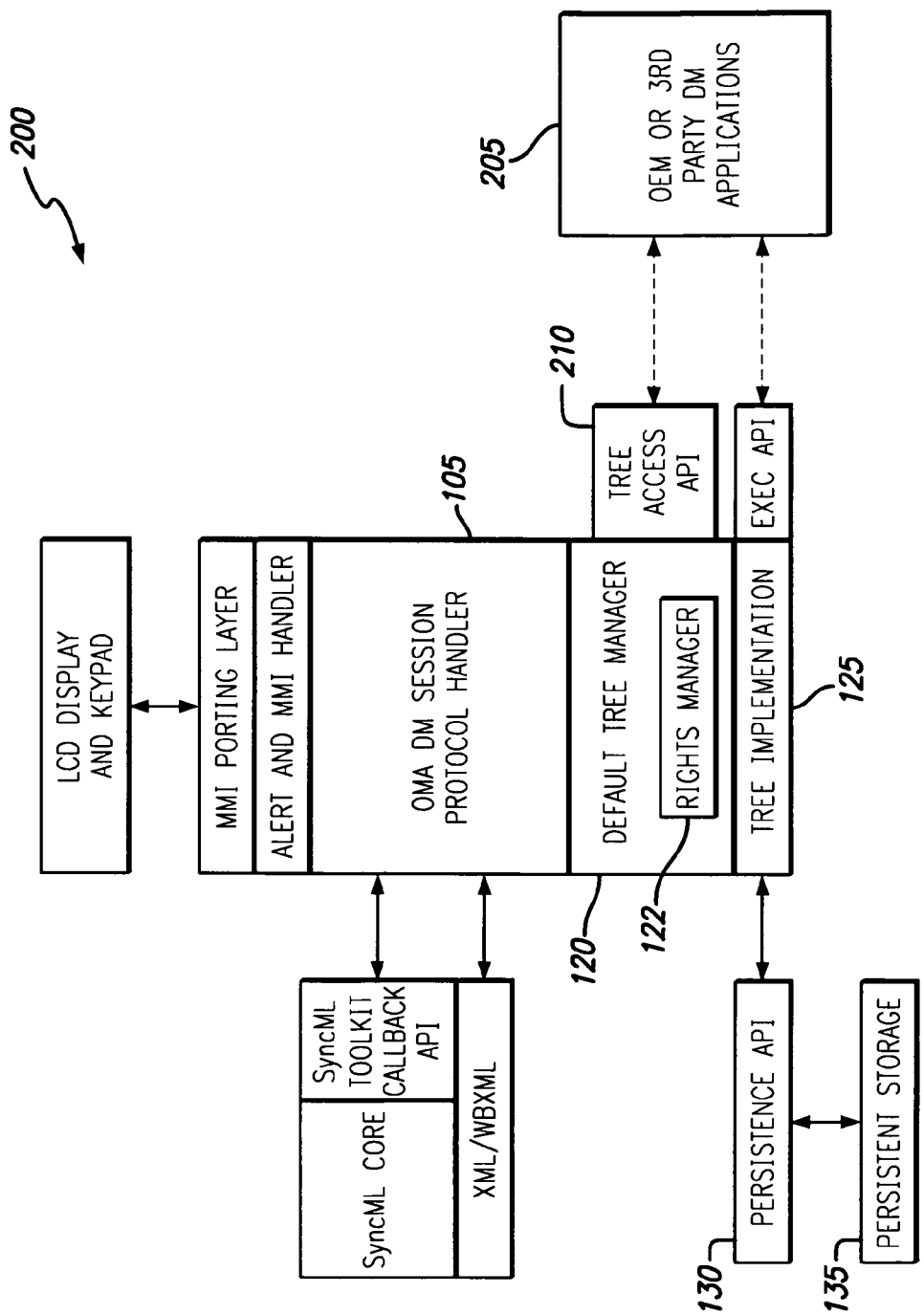
FIG. 2 illustrates an open management client software architecture components, employing a Tree Access API, allowing Original Equipment Manufacturer (OEM) and $3^{rd}$ party DM software applications to access physically stored device management information.

The present design will now be described in relation to an exemplary open management client software component executing on a mobile device as illustrated in FIG. 2, showing the various components implemented to support OEM and 3$^{rd}$ party applications 205 (i.e. locally stored on the mobile device) to retrieve, store, and provide DM information physically stored within the mobile device.

One embodiment of the present design is an OEM software application 205 (e.g. WAP browser, Email client, Multimedia Messaging Service (MMS) messaging, General Packet Radio Service modem driver) that on start-up requires previously configured application settings and user preferences.

Access to the Default Tree Manager 120 and subsequently the Tree Implementation 125 by mobile device software applications is provided via a Tree Access API 210. The Tree Access API 210 provides functions to add and delete nodes; get and replace the values associated with a node; and to get and replace property metadata associated with a node. OEM and $3^{rd}$ party applications 205 may query and set the data values and metadata values of the nodes in the tree in accordance with the permissions stored in the Rights Management 122 (i.e. ACL) settings.

The Default Tree Manager 120 provides access to the tree nodes, via the Tree Implementation 125, and implements the logic necessary to ensure that the requested operation by the application is permissible. This functionality is commensurate with that provided to server-hosted applications as previously described. When an OEM or 3rd party application needs to retrieve or store DM information, the application may query or set data values and metadata values of the nodes in the tree via the Tree Access API 210 in accordance with the permissions stored in the Rights Management 122 (i.e. ACL and AccessType values) settings.

A further embodiment of the present design is a software component that stores configuration data at a well known fixed address, and it is desired to update this directly rather than wait for the server to come and retrieve it.

Figure 3:
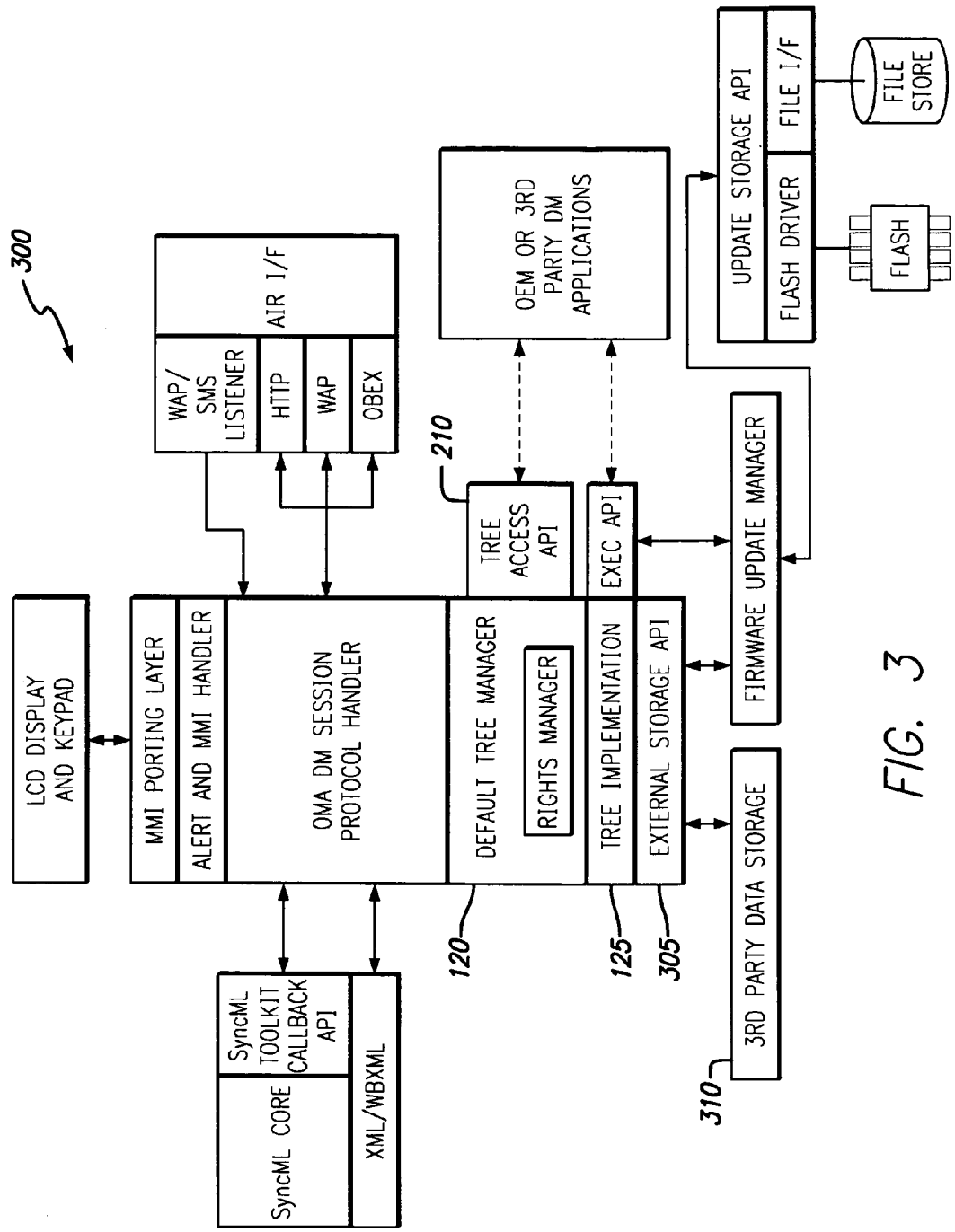
FIG. 3 illustrates an open management client software architecture components, employing an External Storage API, allowing a mobile device to store DM information external to the management tree.

The present design will now be described in relation to an exemplary open management client software component executing on a mobile device as illustrated in FIG. 3, wherein the various implemented components are shown that support software applications (e.g. OTA server-hosed and locally stored on the mobile device) to retrieve, store, and provide DM information physically stored external to the Tree Implementation 125 by way of the Persistent Storage 135 within the mobile device.

The present design implements an external storage mechanism that allows a data value for a node to be stored external to the tree implementation data structure. This is achieved by associating a function to be called to read and write the data value with each node. The functions for these callbacks and the functions for registering them are defined in the External Storage API 305. Those nodes with no functions registered store their data in the Tree Implementation 125 data structure and use the persistent storage mechanism previously described. Data values for nodes stored via the External Storage API 305 (i.e. external to tree implementation data structure) may be accessed via the Tree Access API 210. The External Storage API 305 physically stores these data values in $3^{RD}$ Party Data Storage 310 hardware. The Default Tree Manager 120 ACL based and AccessType rights management facilities, described previously for the tree implementation data structure, remain in-effect for resident DM software applications accessing this externally stored data values using the Tree Access API 210. The present design provides a function to load the entire DM tree from persistent storage and a similar function to write the entire DM tree to persistent storage.

The present design incorporates a firmware update mechanism to enable a mobile device to receive and store firmware update packages. The OMA Device Management standard provides a Firmware Update Management Object (FUMO) for supporting firmware updates within a mobile device. FUMO is a component of the DM specification to allow firmware of the mobile device to be updated. Basically, a node is provided within the management tree specifically for calling relevant operations related to firmware download and update. The present design firmware update mechanism implements storing an update package in the mobile device's local file store system in accordance with this published DM standard. In addition, this mechanism provides the capability to store the update package at a fixed pre-allocated location in the mobile device's flash memory as an alternative physical storage device.

Figure 4:
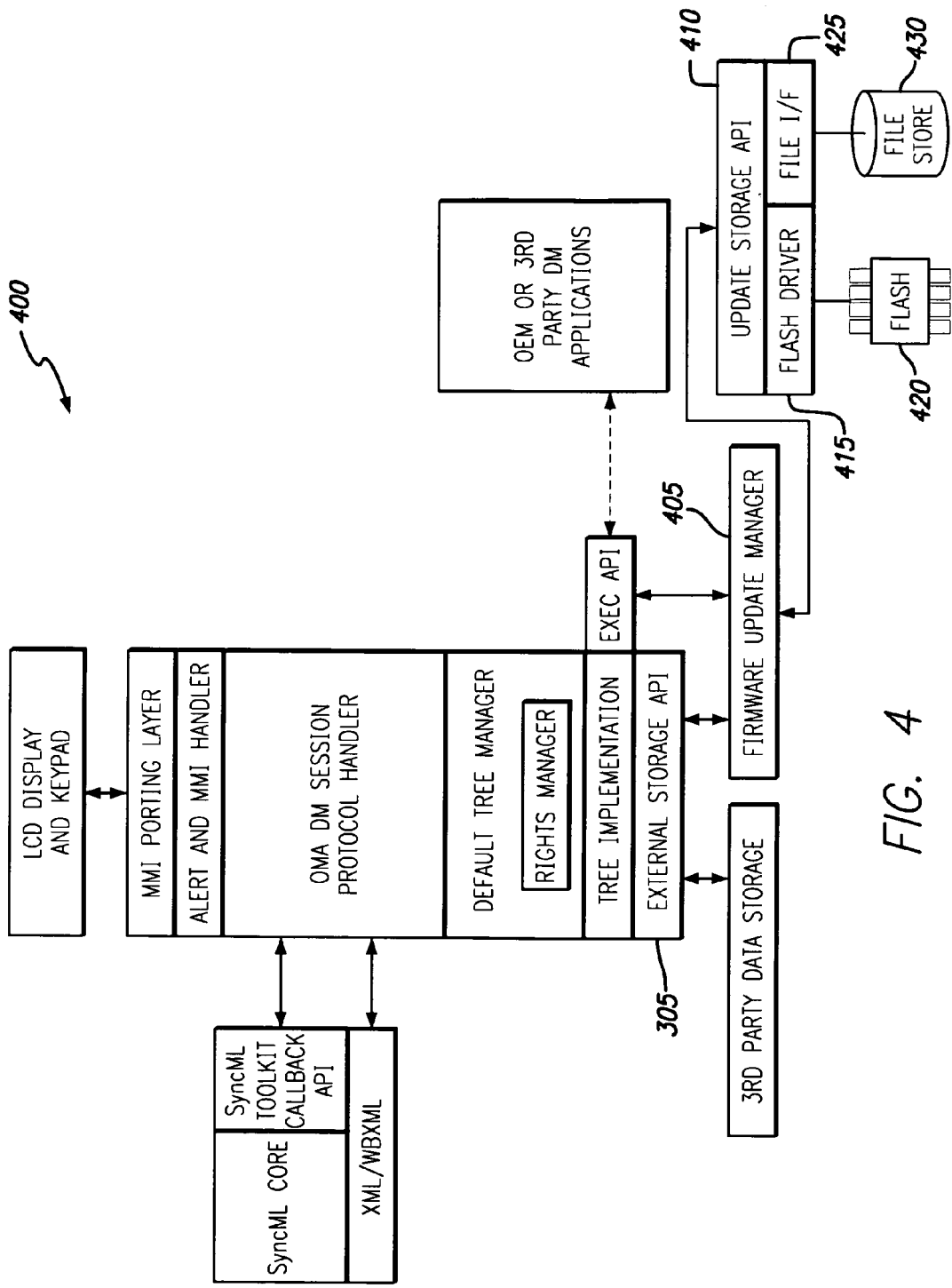
FIG. 4 illustrates an open management client software architecture components, employing an Exec API and a Firmware Update Manager, allowing update packages to be stored in either flash memory or a local file store.

The firmware update mechanism will now be described in relation to general client software architecture as illustrated in FIG. 4 that depicts the present designs implemented components. The firmware update mechanism is responsible for:

1. Handling the notification of a firmware update,
2. Transferring the update to the mobile device,
3. Storing the data ready for the update agent to apply,
4. Triggering the update agent and,
5. Informing the server of the outcome (i.e. status) of the update.

These components enable over-the-air downloading of one or more firmware update packages and their storage in either flash memory or on the local file storage system. In order to realize this capability and exploit the device management tree, the Firmware Update Manager 405 registers itself via the External Storage API 305 as the owner of the data for the PkgData node, one of the nodes comprising the FUMO in the device management tree. This is achieved by the Firmware Update Manager 405 calling a registration function to register a set of callback functions for this particular leaf node (i.e. the PkgData node) in the DM tree that will then be called when data operations are required on that node.

Moving on, the Firmware Update Manager 405 is responsible to ensure the update package is successfully transferred to the appropriate location within the specified physical storage media. The downloaded update package may be written to either to flash memory 420 by the flash driver 415 or a file store 430 by the File I/F 425 via the Update Storage API 410. The Update Storage API abstracts the storage operation, so that the calling software calls the same functions to write and read the update package, regardless of whether the storage is via the flash driver, or file I/F.

Figure 5:
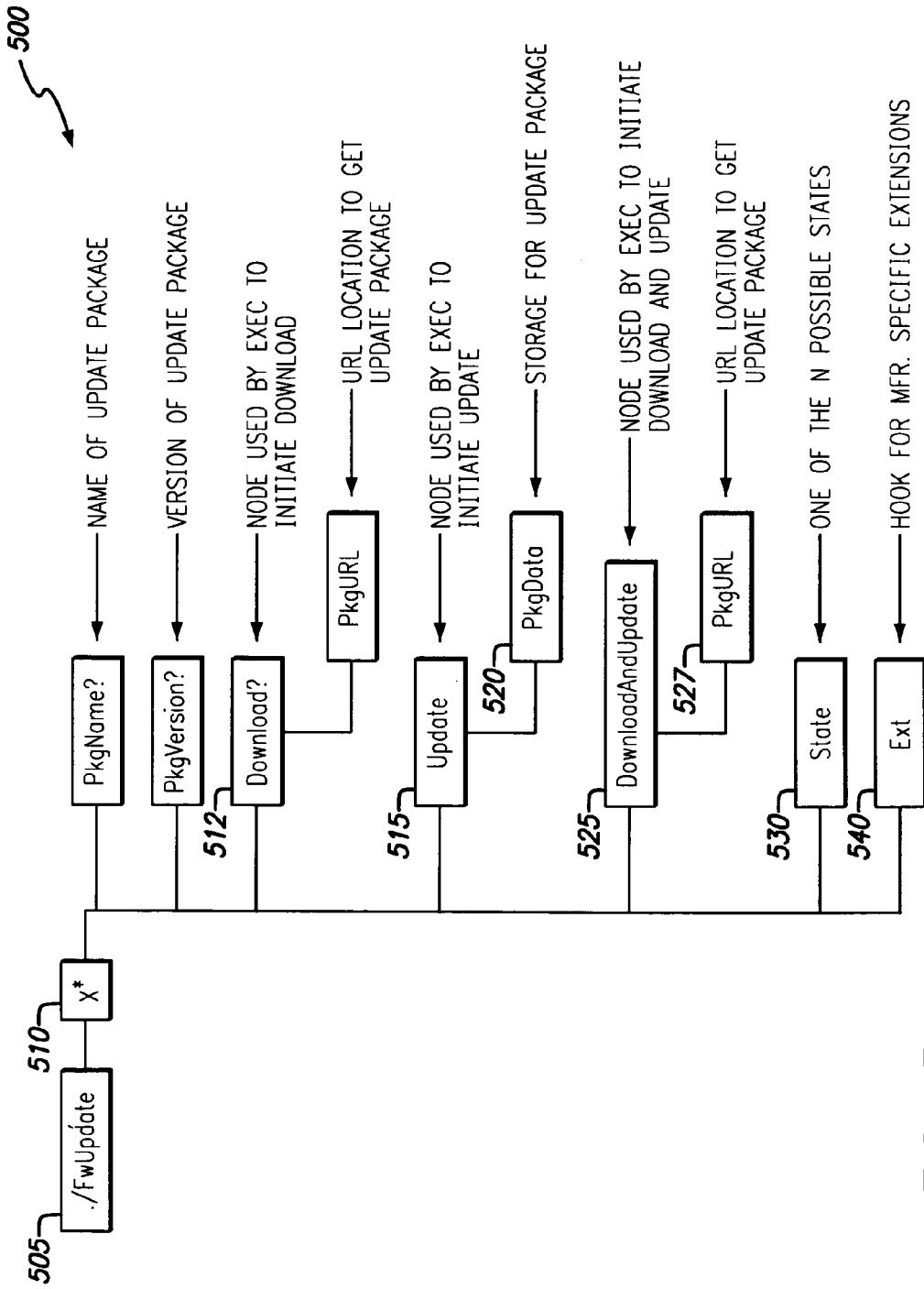
FIG. 5 shows a schematic representation of a firmware update node within the DM management tree in accordance with the OMA DM Firmware Update Management Object.
Figure 6:
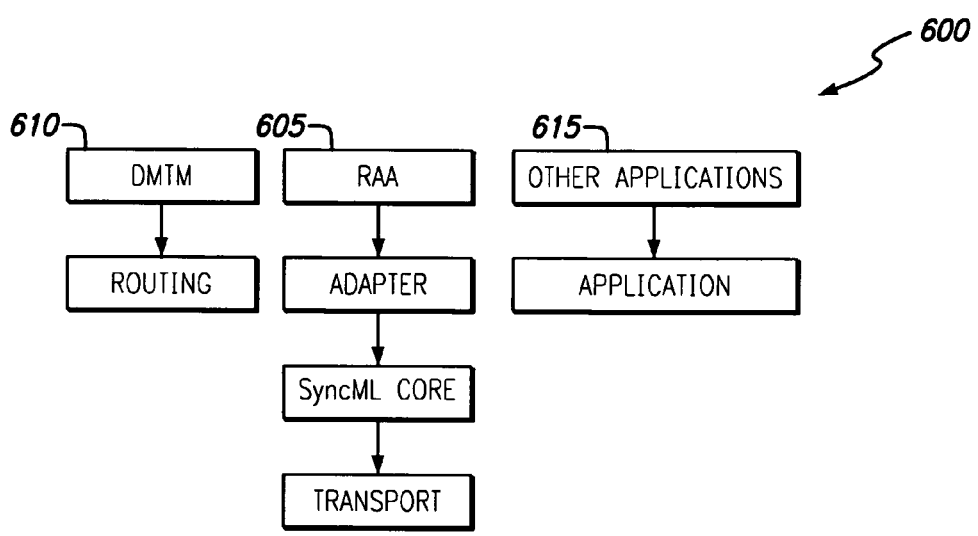
FIG. 6 shows a schematic representation of a Routing Adapter Application.

The FUMO portion of the DM standard defines a firmware update node within the tree management data structure that must be present in all devices that support firmware updating. The Firmware Update Manager 405 implements this node. The portion of the DM tree owned by the Firmware Update Manager 405 after it registers with the External Storage API 305 is illustrated in FIG. 5. The Firmware Update node 505 may support zero, one, or a plurality of nodes consistent with the format presented in FIG. 5, affording the capability to download one or more firmware update packages to a device prior to installation. The FUMO standard requires that each node be uniquely named. Multiple unique nodes are represented in FIG. 5 at 510.

The present design supports two methods for downloading an update package from a DM compliant server. The first method implements an in-session downloading method, as originally defined by the OMA DM standards. This method allows the update package to be transferred by replacing the value of the Package Data node 520 in the device management tree to specify where the update package is to be stored. This provides the ability to write the data in the appropriate storage location (i.e. flash memory of file store) in the mobile device. The Firmware Update Manager registers the functions that should be executed to perform the relevant operations when an EXEC command is received from the server related to Download 512, Update 515, or DownloadAndUpdate 525.

The Package Data node 520 value, representing where the update package is to be written and stored, is read when the Firmware Update Manager receives an EXEC command from the server through the Exec API 440, which provides a facilities enabling various update and download operations to be triggered, to initiate the updating process which is then executed on the Update node 515. Thus, the update package is transferred to the mobile device and written to the appropriate location for storage. Although this method has the advantage of simplicity, it is suitable where the update package is not too large. This method does not provide a restart capability, so if the update process is interrupted (i.e. a communications failure), the whole process must be repeated from the beginning.

The second method replaces the DownloadAndUpdate node 525 Package Universal Resource Locator (URL) node 527 with a URL from which the download descriptor is to be downloaded. The DownloadAndUpdate node 525 Package URL 527 value, representing where the download descriptor should be retrieved, is read when the Firmware Update Manager receives an EXEC command from the server through the Exec API 440 to initiate the download and update process via the DownloadAndUpdate node 525. The descriptor is then downloaded based on this trigger from the server. This descriptor contains information about the URL from which the actual package should be downloaded. The actual package is then downloaded using the HTTP 1.1 protocol. Thus, the update package is transferred to the mobile device and written to the appropriate location for storage. The use of HTTP 1.1 protocol and its byte range option allows the download to be restarted from the point of failure if during this stage any communications failure occurs. This avoids the need to download the entire package again.

Once the update package has been written to storage, an update agent may be triggered to apply the update package to the existing firmware of the mobile device. The update agent is responsible for decoding the update data and re-flashing the indicated flash blocks. The update agent needs to be invoked very early in the boot process in order to be able to update the firmware. Upon execution, the update agent checks to see if there is an update to perform. If an update is pending, the update agent applies the update package to the device's firmware image. The present design provides an entry point, which behaves like a jump instruction, that allows the boot code to invoke and pass control to the update agent, and provides an exit point, which behaves in a similar manner, that the update agent will call on completion. The specific details of the update agent integration and processing are not required to understand the present design and should be evident to one skilled in the art.

When the update package is applied, using either of these two methods, the DM server distributing the update may then read back the status from the State node 530.

In addition, the present design provides a data structure that is dynamic. The tree supports both static and dynamic elements within the tree and affords servers the ability to instruct the client to add nodes and leaves under nodes called Ext 540. The present design affords external software components the ability to provide their own plug-in to manage branches of the DM tree, and to provide a default behavior for the standard management objects, and any additional objects which do not define their own call back functions. The SyncML toolkit provides a mechanism to allow the SyncML application to register its callbacks, but assumes that the same callback will be used for a particular operation (e.g. Replace) for the whole tree. The present design enhances this architecture by adding a Routing Adapter Application 605, which registers itself to provide all the callback functions to the SyncML core. In turn, the present design DM Tree Manager 610 registers its functions with the RAA as the callbacks to be used for the root of the DM tree. This provides the default handling of all objects not in a branch handled by another application. For example, the present design's Firmware Update Manager 405 registers itself as the handler for the FUMO. Other OEM or 3$^{rd}$ party applications 615 may register themselves as the handler for other parts of the tree. An example would be an application supporting SyncML Data Synchronization mechanism.

The present design thus includes, in one embodiment, a method for exchange of management information between one or more Open Management Alliance (OMA) Synchronous Markup Language (SyncML) Device Management (DM) compliant servers and a client executing in a mobile device. The method includes implementing a compatible OMA DM open management client, able to handle parameter provisioning functions, receiving one or more over-the-air provisioning parameters from a OMA SyncML DM server, by the open management client within the mobile device, storing the provisioning parameters in a management tree data structure, retrieving DM information stored in the mobile device, applying rights management via Access Control Lists, and accessing the provisioning parameters by application programs.

The foregoing descriptions of specific embodiments of the present design have been presented for the purposes of illustration and description. They are not intended to be exhaustive or to limit the design to the precise forms disclosed, and should be understood that many modifications and variations are possible in light of the above teaching. The embodiments were chosen and described in order to best explain the principle of the invention and its practical application, to thereby enable others skilled in the art to best utilize the invention and various embodiments with various modifications as are suited to the particular use contemplated. The present invention has been described in a general software update environment. However, the present invention has applications to other software environments requiring over-the-air delivery of an update package resulting from a difference application. Therefore, it is intended that the scope of the invention be defined by the claims appended hereto and their equivalents.

What is claimed is:

1. A method for exchange of information between an Open Management Alliance (OMA) Synchronous Markup Language (SyncML) Device Management (DM) compliant server and a mobile device, said method comprising:
   Receiving one or more over-the-air provisioning parameters from an OMA SyncML DM compliant server;
   Storing said provisioning parameters received from the OMA SyncML DM compliant server in a management tree data structure within the mobile device;
   Retrieving DM information stored in the mobile device;
   Applying rights management via an Access Control List, wherein applying rights management comprises the mobile device evaluating the Access Control List against the DM information retrieved and selectively applying DM information retrieved in accordance with the Access Control List; and
   Enabling application programs to access the provisioning parameters received from the OMA SyncML DM compliant server using a pseudo hostname, wherein access is granted based on rights management according to the management tree data structure and the Access Control Lists.

2. The method of claim 1, the mobile device further comprising an open management client, wherein said open management client further comprises a software component to handle the DM communication session allowing the mobile device to interoperate with an OMA DM compliant server application from one or more manufacturers through a communications channel using one or more access protocols.

3. The method of claim 1, the mobile device further comprising an open management client, wherein said open management client further comprises a software component to extend the OMA SyncML DM standard allowing for a plurality of software applications to communicate with a DM server.

4. The method of claim 1, the mobile device further comprising an open management client, wherein said open management client further comprises a software component to receive one or more synchronous alert messages from a DM server and to forward said alerts to a man machine interface.

5. The method of claim 1, the mobile device further comprising an open management client, wherein said open management client further comprises a software component to route the appropriate response back to the originating DM server, based on user input.

6. The method of claim 1, wherein said storing further comprises implementing a management tree data structure to persistently store named key/value pairs in accordance with the abstraction defined in the OMA DM standard consisting of named nodes each containing one or more sub-nodes or one or more leaves (i.e. name/value pairs).

7. The method of claim 6, wherein said management tree data structure further comprises implementing a data structure supporting both static and dynamic elements within the tree.

8. The method of claim 6, wherein said management tree data structure further comprises implementing a mechanism enabling external software components to manage branches of the DM tree.

9. The method of claim 6, wherein said management tree data structure further comprises implementing a routing adapter application mechanism to provide all the callback functions to the SyncML core.

10. The method of claim 1, wherein said storing further comprises a management tree data structure implementing how and where the nodes of the DM tree exist and where the associated data values and metadata are stored.

11. The method of claim 1, wherein said storing further comprises implementing an external storage mechanism to allow a data value for a node to be stored external to the management tree data structure.

12. The method of claim 1, the mobile device further comprising an open management client, wherein said open management client further comprises a software component providing access to a tree management data structure by implementing a plurality of callback functions required by a SyncML protocol supporting all received SyncML commands (e.g. add and delete nodes, get and replace values, Exec, etc,).

13. The method of claim 1, the mobile device further comprising an open management client, wherein said open management client further comprises writing the data structure to flash memory or a flash file system.

14. The method of claim 1, wherein said accessing further comprises implementing components to support locally stored applications to retrieve, store and provide DM information physically stored within the mobile device.

15. A method for exchanging information executing in a mobile device, comprising:
receiving provisioning parameters from an Open Management Alliance (OMA) Synchronous Markup Language (SyncML) Device Management (DM) compliant server;
storing said provisioning parameters received from the OMA SyncML DM compliant server in a management tree data structure within the mobile device;
applying rights management via an Access Control List, wherein applying rights management comprises the mobile device evaluating the Access Control List against the information retrieved and selectively applying information retrieved in accordance with the Access Control List; and
enabling application programs to access the provisioning parameters received from the OMA SyncML DM compliant server using a pseudo hostname, wherein access is granted based on rights management according to the management tree data structure and to the Access Control List.

16. The method of claim 15, the mobile device further comprising an open management client, wherein said open management client further comprises a software component to handle the communication session allowing the mobile device to interoperate with a server application from one or more manufacturers through a communications channel using one or more access protocols.

17. The method of claim 15, the mobile device further comprising an open management client, wherein said open management client further comprises a software component to extend standards allowing for a plurality of software applications to communicate with the server.

18. The method of claim 15, the mobile device further comprising an open management client, wherein said open management client further comprises a software component to receive one or more synchronous alert messages from the server and to forward said alerts to a man machine interface.

19. The method of claim 15, the mobile device further comprising an open management client, wherein said open management client further comprises a software component to route the appropriate response back to an originating server, based on user input.

20. A mobile device comprising:
means for receiving provisioning parameters from an Open Management Alliance (OMA) Synchronous Markup Language (SyncML) Device Management (DM) compliant server;
means for storing said provisioning parameters received from the OMA SyncML DM compliant server in a management tree data structure within the mobile device;
means for applying rights management via an Access Control List, wherein applying rights management comprises the mobile device evaluating the Access Control List against the information retrieved and selectively applying information retrieved in accordance with the Access Control List; and
means for enabling application programs to access the provisioning parameters received from the OMA SyncML DM compliant server using a pseudo hostname, wherein access is granted based on rights management according to the management tree data structure and the Access Control List.

21. The mobile device of claim 20, further comprising a software component to handle the communication session allowing the mobile device to interoperate with a server application from one or more manufacturers through a communications channel using one or more access protocols.

22. The mobile device of claim 20, further comprising a software component to extend standards allowing for a plurality of software applications to communicate with the OMA SyncML DM compliant server.

23. The mobile device of claim 20, further comprising a software component configured to receive one or more synchronous alert messages from the OMA SyncML DM compliant server and to forward said alerts to a man machine interface.

24. The mobile device of claim 20, wherein said client further comprises a software component to route the appropriate response back to an originating server, based on user input.

* * * * *